United States Patent
Serdyukov et al.

(10) Patent No.: US 9,501,575 B2
(45) Date of Patent: Nov. 22, 2016

(54) SEARCH RESULT RANKER

(71) Applicant: YANDEX EUROPE AG, Lucerne (CH)

(72) Inventors: Pavel Viktorovich Serdyukov, Moscow (RU); Yury Mikhailovich Ustinovskiy, Moscow (RU); Gleb Gennadievich Gusev, Msocow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 14/866,380

(22) Filed: Sep. 25, 2015

(65) Prior Publication Data

US 2016/0019219 A1    Jan. 21, 2016

Related U.S. Application Data

(63) Continuation of application No. PCT/IB2014/066704, filed on Dec. 8, 2014.

(30) Foreign Application Priority Data

Jun. 30, 2014 (RU) ................................ 2014126774

(51) Int. Cl.
*G06F 17/30* (2006.01)

(52) U.S. Cl.
CPC ... *G06F 17/30867* (2013.01); *G06F 17/30864* (2013.01)

(58) Field of Classification Search
CPC .................... G06F 17/30864; G06F 17/30867
USPC .......................... 707/723, 749, 759; 705/348
See application file for complete search history.

(56) References Cited

U.S. PATENT DOCUMENTS

| | | | |
|---|---|---|---|
| 7,805,438 B2 * | 9/2010 | Liu | ............ G06F 17/30687 707/723 |
| 8,615,514 B1 | 12/2013 | Fernandes et al. | |
| 8,645,390 B1 | 2/2014 | Oztekin et al. | |
| 8,738,596 B1 | 5/2014 | Kim et al. | |
| 2006/0004711 A1 | 1/2006 | Naam | |
| 2006/0224577 A1 * | 10/2006 | Hullender | ......... G06F 17/30864 707/723 |
| 2007/0255689 A1 | 11/2007 | Sun et al. | |
| 2009/0006360 A1 | 1/2009 | Liao et al. | |
| 2009/0089274 A1 | 4/2009 | Chapelle | |
| 2010/0070498 A1 | 3/2010 | Zhang et al. | |

(Continued)

OTHER PUBLICATIONS

Supplementary European Search Report for EP 14890458 dated Feb. 8, 2016; Palomares de Castro.

(Continued)

*Primary Examiner* — Shahid Alam
(74) *Attorney, Agent, or Firm* — BCF LLP (57) ABSTRACT

A computerized method for optimizing search result rankings obtained from a search result ranker has the steps of retrieving a first set of query-document pairs, each query-document pair of the first set having an associated post-impression features vector; generating a weight vector having a number of weights corresponding to a number of post-impression features in each of the post-impression feature vector of the first set; generating a target function by using the weight vector and the post-impression features vectors of the first set; using a performance metric associated with the target function, optimizing the weights of the weight vector using the first set of query-document pairs to obtain an optimized target function; optimizing the search result ranker using the optimized target function; and using the optimized search result ranker to rank search results.

17 Claims, 4 Drawing Sheets

(56) References Cited

U.S. PATENT DOCUMENTS

| | | | |
|---|---|---|---|
| 2010/0082510 A1 | 4/2010 | Gao et al. | |
| 2010/0082582 A1 | 4/2010 | Gao et al. | |
| 2010/0198857 A1 | 8/2010 | Metzler et al. | |
| 2010/0250523 A1* | 9/2010 | Jin | G06F 17/30864 707/723 |
| 2010/0318540 A1 | 12/2010 | Svore et al. | |
| 2011/0184883 A1 | 7/2011 | El-Charif et al. | |
| 2012/0022937 A1 | 1/2012 | Bhatia et al. | |
| 2012/0143790 A1 | 6/2012 | Wang et al. | |
| 2014/0095495 A1 | 4/2014 | Brukman et al. | |
| 2014/0149429 A1 | 5/2014 | Gao et al. | |

OTHER PUBLICATIONS

International Search Report from PCT/IB2014/066704; Blaine R. Copenheaver; Mar. 31, 2015.

Agichtein et al., Improving Web Search Ranking by Incorporating User Behavior Information, SIGIR'06, Aug. 6-11, 2006, Seattle, Washington, USA.

Bennett et al., Inferring and Using Location Metadata to Personalize Web Search, SIGIR'11, Jul. 24-28, 2011Beijing, China.

Bennett et al., Modeling the Impact of Short- and Long-Term Behavior on Search Personalization, SIGIR'12, Aug. 12-16, 2012, Portland, Oregon, USA.

Collins-Thompson et al, Personalizing Web Search Results by Reading Level, CIKM'11, Oct. 24-28, 2011, Glasgow, Scotland, UK.

Dou et al., A Largescale Evaluation and Analysis of Personalized Search Strategies, International World Wide Web Conference Committee, WWW 2007, May 8-12, 2007, Banff, Alberta, Canada.

Dupret et al., A Model to Estimate Intrinsic Document Relevance from the Clickthrough Logs of a Web Search Engine, pp. 181-190, WSDM'10, Feb. 4-6, 2010, New York City, New York, USA.

Friedman, Stochastic Gradient Boosting,Technical Discussion of TreeNET (TM), Mar. 26, 1999, pp. 1-10, www.salford-systems.com/treenet.html.

Hassan, A Semi-Supervised Approach to Modeling Web Search Satisfaction, Microsoft Research, SIGIR'12, Aug. 12-16, 2012, Portland, Oregon, USA, pp. 275-284.

Hassan et al, Beyond DCG User Behavior as a Predictor of a Successful Search, WSDM'10 Feb. 4-6, 2010, New York City, New York, USA.

Jiang et al., Context-Aware Search Personalization with Concept Preference, CIKM'11, Oct. 24-28, 2011, Glasgow, Scotland, UK, pp. 563-572.

Joachims, Optimizing Search Engines using Clickthrough Data, SIGKDD 02 Edmonton, Alberta, Canada, 2002.

Liu et al., Understanding Web Browsing Behaviors through Weibull Analysis of Dwell Time, SIGIR'10, Jul. 19-23, 2010, Geneva, Switzerland.

Matthijs et al., Personalizing Web Search using Long Term Browsing History, WSDM'11, Feb. 9-12, 2011, Hong Kong, China.

Radlinski et al., How Does Clickthrough Data Reflect Retrieval Quality?, CIKM'08, Oct. 26-30, 2008, Napa Valley, California, USA.

Shen et al., ContextSensitive Information Retrieval using Implicit Feedback,SIGIR'05, Aug. 15-19, 2005, Salvador, Brazil.

Shokouhi et al., Fighting Search Engine Amnesia: Reranking Repeated Results, SIGIR'13, Jul. 28-Aug. 1, 2013, Dublin, Ireland.

Sontag et al., Probabilistic Models for Personalizing Web Search, WSDM'12, Feb. 8-12, 2012, Seattle, Washington, USA.

Tan et al., Mining Long-Term Search History to Improve Search Accuracy, KDD'06, Aug. 20-23, 2006, Philadelphia, Pennsylvania, USA.

Taylor et al., SoftRank: Optimising Non-Smooth Rank Metrics, SIGIR LETOR Workshop '07 Amsterdam, Netherlands.

Volkovs et al., BoltzRank: Learning to Maximize Expected Ranking Gain, Proceedings of the 26th International Conference on Machine Learning, Montreal, Canada, 2009.

White et a., Predicting Short-Term Interests Using Activity-Based Search Context, CIKM'10, Oct. 26-30, 2010, Toronto, Canada.

White et al., Enhancing Personalized Search by Mining and Modeling Task Behavior, International World Wide Web Conference Committee, WWW 2013, May 13-17, 2013, Rio de Janiero, Brazil.

Xiang et al., Context-Aware Ranking in Web Search, SIGIR'10, Jul. 19-23, 2010, Geneva, Switzerland, pp. 451-458.

Xu et al., Directly Optimizing Evaluation Measures in Learning to Rank, SIGIR'08, Jul. 20-24, 2008, Singapore.

Xu et al., Optimal Reverse Prediction A Unified Perspective on Supervised, Unsupervised and Semi-supervised Learning, Proceedings of the 26th International Conference on Machine Learning, Montreal, Canada, 2009.

Kim et al., Modeling Dwell Time to Predict Click-level Satisfaction, WSDM'14, Feb. 24-28, 2014, New York, New York, USA.

Yue et al., Learning More Powerful Test Statistics for Click-Based Retrieval Evaluation, SIGIR'10, Jul. 19-23, 2010, Geneva, Switzerland.

Zhong et al., Incorporating Post-Click Behaviors into a Click Model, SIGIR 2010 Geneva, Switzerland.

Qin et al., Learning to Rank Relational Objects and Its Application to Web Search, International World Wide Web Conference Committee, WWW 2008, Apr. 21-25, 2008, Beijing, China.

Wang et al., Personalized Ranking Model Adaptation for Web Search, SIGIR'13, Jul. 28-Aug. 1, 2013, Dublin, Ireland.

* cited by examiner

SEARCH RESULT RANKER

CROSS-REFERENCE

The present application claims priority to Russian Patent Application No. 2014126774, filed Jun. 30, 2014, entitled "SEARCH RESULT RANKER" and is a continuation of PCT/IB2014/066704 filed on Dec. 8, 2014, entitled "SEARCH RESULT RANKER" the entirety of which are incorporated herein.

FIELD OF TECHNOLOGY

The present technology relates to search result rankers, and more specifically to a method of optimizing search result rankers.

BACKGROUND

When performing an internet search using a search system such as the search engine provided by Yandex™ (www.yandex.com), a server first receives the search query entered by the user on the user's device, such as a computer, smartphone or tablet, the server then retrieves documents to the query, a search result ranker ranks the documents, and then the server sends instructions to the client device to display a search engine results page (SERP). The SERP provides a list of links to the documents, and typically also a portion of the document (or a snapshot, also known as a "snippet" of information, available on the document), ranked in order of relevance.

The documents that the search system finds can vary greatly in their usefulness. One of the major challenges in ranking search results is to determine how to place the most relevant documents at the top of the search output (i.e. the SERP).

In some search systems, relevancy is used by the search result ranker to rank the results. Relevancy defines how well a document matches the search query. The more relevant a document is, the higher it is positioned. In some relevancy-based search systems, relevancy is calculated based on a ranking formula, which is a function of multiple factors. A factor is a numerical characteristic of a query, document, or query-document pair that can be used for assessing the appropriateness of a result in the query output.

Examples of factors include the number of words from the search query that are in the document text and whether the query belongs to a certain category. In some cases, a document's relevancy may also depend on the user who submitted the query.

The number of indexed documents and the needs of users are constantly changing. This is why the ranking formula of the search result ranker must be updated regularly. Machine learning methods are used for changing the formula. Using expert assessment data providing the relevancy of a set of known documents to a set of known search queries, dependencies are identified between document characteristics and their placement in the search output (i.e. the SERP). These dependencies are used for making changes to the formula.

The expert assessment data used for machine learning are ratings that describe how appropriately and correctly documents are ordered in the search output for specific queries. Assessors make these ratings.

Besides being used in machine learning, the assessors' ratings are also used for evaluating the quality of search results, meaning the users' satisfaction with the search results and their placement in the output.

However, providing such expert assessment data when large scale sample collection is necessary is impractical and very complicated. Such large scale sample collection is necessary to personalize search results for example. Personalization makes it possible to rank search results based on users' personal interests, thus improving search quality. For example, depending on a user's profile, the search for the term «zeppelin» should rank documents relating to this type of airship highest for some user, while for other users the highest ranked documents should be those relating to the band Led Zeppelin.

In order to improve rankings for such large scale data collection, some search systems now look at the interaction of the users with the search results presented on the SERP instead of or in addition to the expert assessment data. This data, sometimes referred to as post-impressions features, is then used to improve the formula of the search result ranker and therefore the ranking of documents for future searches. Examples of post-impression features include whether a document has been clicked or not or the amount of time a user has looked at a document, sometimes referred to as dwell time.

However, it is not because a document has been clicked in the SERP that it is relevant. Similarly, it is not because a document has not been clicked that it is not relevant. Looking at features such as dwell time may offer a better idea as to the relevance of a document and should therefore yield better rankings. However the amount of dwell time necessary to determine whether a document is relevant or not is selected somewhat arbitrarily.

As such, although taking post-impression features into account should yield improved ranking results, it is difficult to determine which features should be used, and in the case of value related features such as dwell time, what value should be assigned to the feature in order to consider a document relevant in order to improve the formula of the search result ranker.

There is therefore a need for a method for optimizing search result rankings obtained from a search result ranker.

SUMMARY

It is an object of the present technology to ameliorate at least some of the inconveniences present in the prior art.

According to one aspect of the present technology, there is provided a computerized method for optimizing search result rankings obtained from a search result ranker. The method has the steps of retrieving a first set of query-document pairs, each query-document pair of the first set having an associated post-impression features vector; generating a weight vector having a number of weights corresponding to a number of post-impression features in each of the post-impression feature vector of the first set; generating a target function by using the weight vector and the post-impression features vectors of the first set; using a performance metric associated with the target function, optimizing the weights of the weight vector using the first set of query-document pairs to obtain an optimized target function; optimizing the search result ranker using the optimized target function; and using the optimized search result ranker to rank search results.

In some implementations of the present technology, the method also has the step of selecting a performance metric based on features of the target function.

In some implementations of the present technology, optimizing the search result ranker using the optimized target function includes optimizing the search result ranker using the optimized target function applied to a second set of query-document pairs.

In some implementations of the present technology, after optimizing the search result ranker and before using the search result ranker, the method also has the step of evaluating the optimized search result ranker using a third set of query-document pairs.

In some implementations of the present technology, the post-impression features include at least one of at least one document level feature and at least one search engine result page (SERP) level feature.

In some implementations of the present technology, the at least one document level feature includes at least one of: a click feature identifying if a document has been clicked; a dwell feature identifying a dwell time on a document; a long dwell feature identifying if the dwell time on the document is greater than a predetermined amount; a last clicked feature identifying if the document has been clicked last; a first clicked feature identifying if the document has been clicked first; a satisfied click feature identifying if the document has been clicked last or if the dwell time is greater than the predetermined amount; a position feature identifying the original position of the document in the SERP; a skip feature identifying if the document has been skipped; a previous skipped feature identifying if another document prior in a ranking to the document has been skipped; and a skipped above feature identifying a number of documents prior in the ranking to the document have been skipped.

In some implementations of the present technology, the at least one SERP level feature includes at least one of: a top click feature identifying a highest ranking of clicked documents in a ranking; a bottom click feature identifying a lowest ranking of clicked documents in the ranking; a number of clicks feature identifying a number of clicks on a SERP; a top three number of clicks feature identifying a number of clicks on a three highest ranked documents of the SERP; a number of skips feature identifying a number of documents skipped on the SERP; a last query feature identifying a last query in a search session; and an examination time feature identifying a time to a first click on the SERP.

In some implementations of the present technology, the post-impression features include at least one of: a click feature identifying if a document has been clicked; a dwell feature identifying a dwell time on a document; a long dwell feature identifying if the dwell time on the document is greater than a predetermined amount; a last clicked feature identifying if the document has been clicked last; a first clicked feature identifying if the document has been clicked first; a satisfied click feature identifying if the document has been clicked last or if the dwell time is greater than the predetermined amount; a position feature identifying the original position of the document in the SERP; a skip feature identifying if the document has been skipped; a previous skipped feature identifying if another document prior in a ranking to the document has been skipped; a skipped above feature identifying a number of documents prior in the ranking to the document have been skipped; a top click feature identifying a highest ranking of clicked documents in the ranking; a bottom click feature identifying a lowest ranking of clicked documents in the ranking; a number of clicks feature identifying a number of clicks on a SERP; a top three number of clicks feature identifying a number of clicks on a three highest ranked documents of the SERP; a number of skips feature identifying a number of documents skipped on the SERP; a last query feature identifying a last query in a search session; and an examination time feature identifying a time to a first click on the SERP.

In some implementations of the present technology, using the search result ranker comprises: receiving, by at least one server from a client device via a communications network, a search query; effecting, by the at least one server, a search in respect of the search query; ranking, by the at least one server, documents found by the search using the search result ranker incorporating the optimized target function; sending, by the at least one server to the client device via the communications network, instructions to cause a display to a user via a user interface of the client device of a search engine results page (SERP) including links to the documents found by the search, the links being ranked on the SERP according to the ranking of the documents found by the search.

In some implementations of the present technology, optimizing the weights of the weight vector includes optimizing the weights of the weight vector using a gradient descent technique.

In some implementations of the present technology, the performance metric is one of mean reciprocal rank (MRR) and mean average precision (MAP).

According to another aspect of the present technology, there is provided a system for optimizing search result rankings obtained from a search result ranker. The system has a processor and a tangible computer readable storage medium communicating with the processor. The tangible computer readable storage medium stores instructions that cause the system to perform the steps of: retrieving a first set of query-document pairs, each query-document pair of the first set having an associated post-impression features vector; generating a weight vector having a number of weights corresponding to a number of post-impression features in each of the post-impression feature vector of the first set; generating a target function by using the weight vector and the post-impression features vectors of the first set; using a performance metric associated with the target function, optimizing the weights of the weight vector using the first set of query-document pairs to obtain an optimized target function; optimizing the search result ranker using the optimized target function; and using the optimized search result ranker to rank search results.

In some implementations of the present technology, the tangible computer readable storage medium also stores instructions that cause the system to perform the step of selecting a performance metric based on features of the target function.

In some implementations of the present technology, wherein optimizing the search result ranker using the optimized target function includes optimizing the search result ranker using the optimized target function applied to a second set of query-document pairs.

According to another aspect of the present technology, there is provided a tangible computer readable storage medium storing instructions for optimizing search result rankings obtained from a search result ranker. The instructions, when executed by a computer, cause the computer to perform operations comprising: retrieving a first set of query-document pairs, each query-document pair of the first set having an associated post-impression features vector; generating a weight vector having a number of weights corresponding to a number of post-impression features in each of the post-impression feature vector of the first set; generating a target function by using the weight vector and the post-impression features vectors of the first set; using a performance metric associated with the target function, optimizing the weights of the weight vector using the first set of query-document pairs to obtain an optimized target function; optimizing the search result ranker using the optimized target function; and using the optimized search result ranker to rank search results.

In some implementations of the present technology, the operations further comprise selecting a performance metric based on features of the target function.

In some implementations of the present technology, wherein optimizing the search result ranker using the optimized target function includes optimizing the search result ranker using the optimized target function applied to a second set of query-document pairs.

In the context of the present specification, a "server" is a computer program that is running on appropriate hardware and is capable of receiving requests (from client devices) over a network, and carrying out those requests, or causing those requests to be carried out. The hardware may be one physical computer or one physical computer system, but neither is required to be the case with respect to the present technology. In the present context, the use of the expression "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "a client device" is any computer hardware that is capable of running software appropriate to the relevant task at hand. Thus, some (non-limiting) examples of client devices include personal computers (desktops, laptops, netbooks, etc.), smartphones, and tablets.

In the context of the present specification, a "database" is any structured collection of data, irrespective its particular structure, database management software, or computer hardware on which the data is stored, implemented or otherwise rendered available for use. A database is in "operational communication" in the present context when it is rendered available for use as part of a database management system that is itself connected to an accessible communications network.

In the context of the present specification, the expression "tangible computer readable storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the servers, nor is their use (by itself) intended to imply that any "second server" must necessarily exist in any given situation.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

An Appendix is provided at the end of the present specification. The Appendix includes a copy of a yet to be published article entitled "Learning Personalization Targets Extracted from User Interaction with Search Engine Results" and a copy of a yet to be published document entitled "Обучение весов примеров (confidence)" (which translates to "Teaching Weights Examples (confidence)"). This article and this document provide additional background information, description of implementations of the present technology and examples. The entireties of this article and of this document are incorporated herein by reference in their entirety, in all those jurisdictions where such incorporation by reference is allowed.

DETAILED DESCRIPTION

Figure 1:
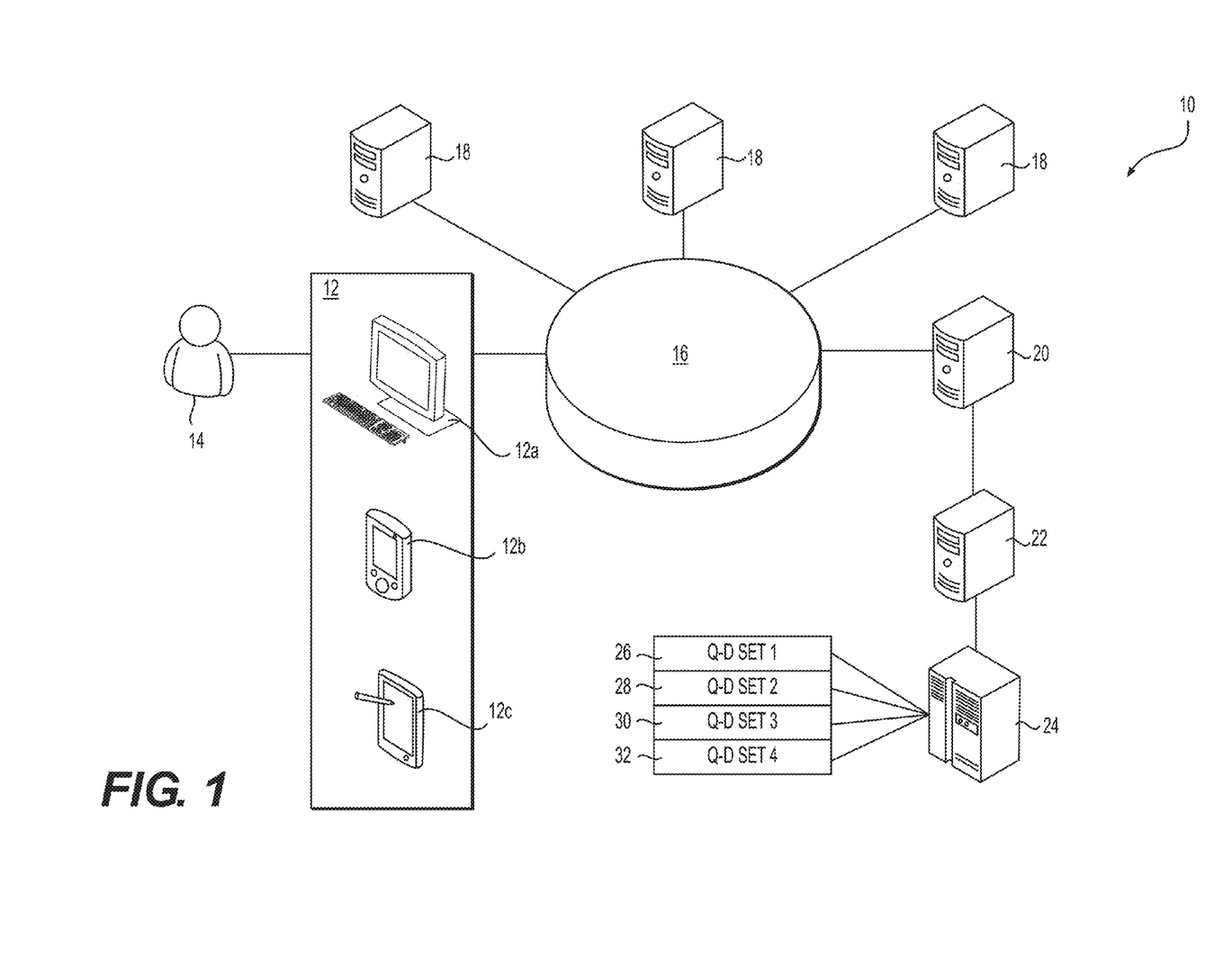
FIG. 1 is a schematic illustration of a computer system being an implementation of the present technology.

Referring to FIG. 1, there is shown a computer system 10 comprising implementations of the present technology. It is to be expressly understood that the computer system 10 is merely one implementation of the present technology. The description thereof that follows is intended to be only a description of an illustrative example of the present technology. This description is not intended to define the scope or set forth the bounds of the present technology. In some cases, what are believed to be helpful examples of modifications to the computer system 10 may also beset forth hereinbelow. This is done merely as an aid to understanding, and, again, not to define the scope or set forth the bounds of the present technology. These modifications are not an exhaustive list, and, as a person skilled in the art would understand, other modifications are likely possible. Further, it should not be interpreted that where this has not been done (i.e. where no examples of modifications have been set forth), that no modifications are possible and/or that what is described is the sole manner of implementing that element of the present. As a person skilled in the art would understand, this is likely not the case. In addition it is to be understood that the computer system 10 provides a simple implementation of the present technology, which is presented in this manner as an aid to understanding. As persons skilled in the art would understand, most implementations of the present technology would be of a greater complexity.

The computer system 10 includes a client device 12 to be used by a user 14. The client device 12 can be any one of the three client devices 12 illustrated in FIG. 1, namely a desktop computer 12A, such as an iMac™, a smartphone 12B, such as an iPhone™ 4S™, and a tablet computer 12C, such as an iPad™. In other implementations, client devices 12 may include other makes and/or models of smartphone, tablet computer, e-reader, laptop computer, desktop computer, personal digital assistant, or another Internet-enabled device.

Client device 12 is in communication with the Internet 16 (which may, depending on particular circumstances be via mobile telephony network, a Wi-Fi network, or a Bluetooth™ connection). The client device 12 has installed thereon a web browser application, such as Safari™, which forms part of a user interface of the client device 12. It is contemplated that other web browsers and/or other Internet-enabled applications may also be installed thereon. Although only a single client device 12 is shown (the user 14 uses one of the client devices 12A, 12B, 12C), it is contemplated that multiple client devices 12 could be used in the system 10.

The computer system 10 also includes a number of servers 18 in communication with the Internet 16. Only three servers 18 are illustrated for simplicity, but is should be understood that more (and less) than three servers 18 are contemplated. For example, it is contemplated that the system 10 could include all of the servers 18 connected to the Internet 16. It is also contemplated that only servers 18 in a particular geographical location could be included in the system 10. The servers 18 each host one or more web pages that can be accessed by the client device 12 via the Internet 16.

The computer system 10 also includes a search engine server 20. Only one search engine server 20 is illustrated for simplicity, but is should be understood that more than one search engine server 20 is contemplated. As can be seen, the search engine server 20 communicates with the Internet 16. It is contemplated that instead of communicating via the Internet 16, that the client device 12 and the servers 18 and 20 24 could communicate via another type of communication network. Examples of alternative communication networks include, but are not limited to, a local area network (LAN), a wide area network, and an intranet. Although not shown, the search engine server 20 also communicates with an indexing database containing indexing information for multiple documents residing on the servers 18 (i.e. web pages, pictures, videos, etc.). This information is obtained using web crawlers (not depicted), for example.

The search engine server 20 also communicates via a network (not separately numbered) with a training server 22. In alternative embodiments, the search engine server 20 can communicate with the training server 22 via the Internet 16.

Only one training server 22 is illustrated for simplicity, but is should be understood that more than one training server 22 is contemplated. As will be described below, the training server 22 is used to optimize a search result ranker used by the search engine server 20 to rank search results. It is contemplated the functions of the search engine server 20 and the training server 22 could be combined or could be further split up so as to be accomplished by more than two servers.

The training server 22 communicates with a query-document (Q-D) pairs database 24. Only one Q-D pairs database 24 is illustrated for simplicity, but is should be understood that more than one Q-D pairs database 24 is contemplated. As its name suggests, the Q-D pairs database 24 contains data for multiple pairs of a query and an associated document (i.e. a Q-D pair). The document of each Q-D pair is a document that has been previously retrieved by the search engine server 20 for the query of the Q-D pair. Although not shown, the Q-D pairs database 24 also communicates with the search engine server 20. It is contemplated that the Q-D pairs database 24 could communicate with the previously mentioned indexing database. It is also contemplated that the Q-D pairs database 24 could be combined with the previously mentioned indexing database. At least some of these Q-D pairs are arranged into sets. Four Q-D sets 26, 28, 30, 32 are illustrated for simplicity, but it should be understood that more or less than four Q-D sets are contemplated.

Figure 2:
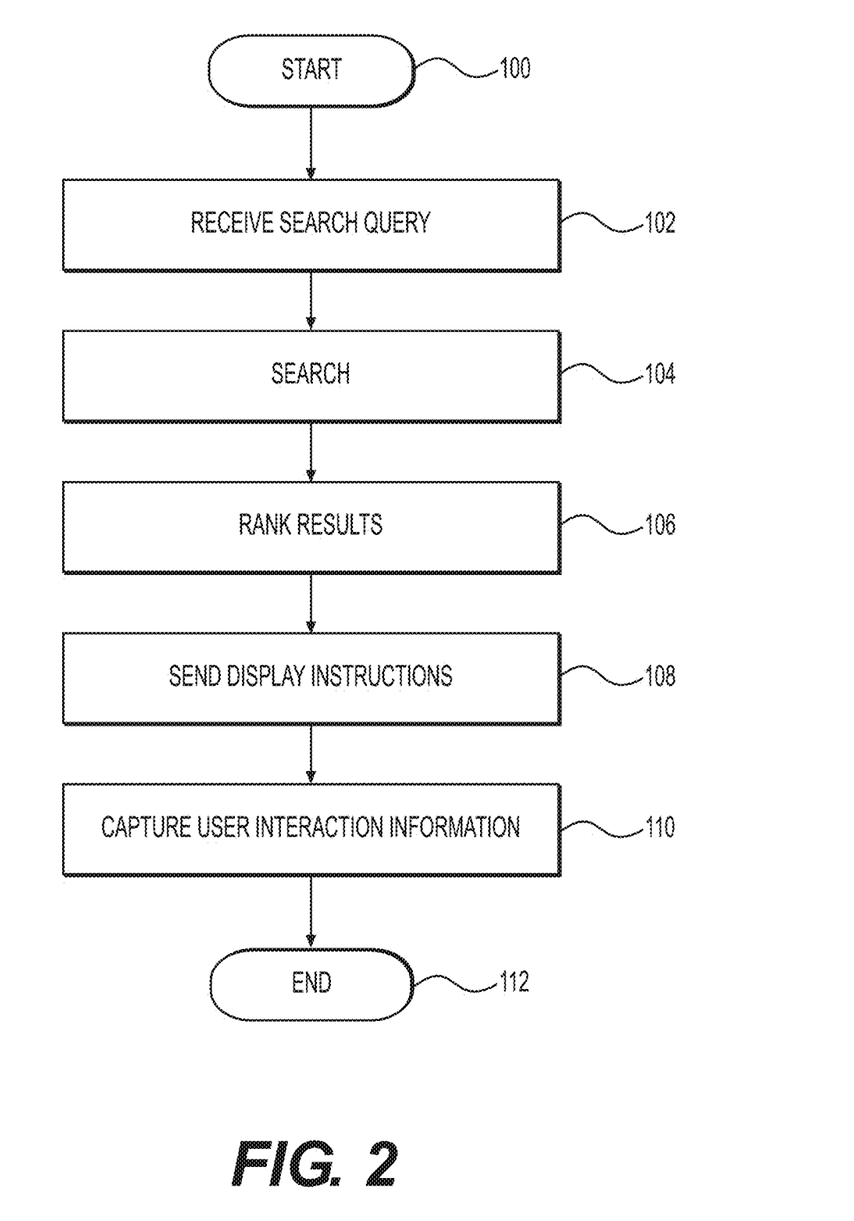
FIG. 2 illustrates a method for providing search results to a user.

Turning now to FIG. 2, the method used by the search engine server 20 to provide search results in response to a user query will be described. The method is initiated at step 100 when the user 14 enters, via the user interface of the client device 12, a search query. In the exemplary user interface illustrated in FIG. 3, the user 14 does this by entering the search query in a search box 50, in this case "Yandex", and by then pressing a search button 52 to launch the search. At step 102, the search engine server 20 receives the search query from the user device 12 via the Internet 16.

At step 104, the search engine sever 20 effects the search for the query and retrieves relevant documents and/or information regarding relevant documents. The search engine server 20 can search the servers 18 via the Internet 16 and/or the indexation database and/or the Q-D pairs database for corresponding queries. It is contemplated that the manner in which the search engine server 20 searches, identifies and retrieves relevant documents (or information regarding relevant documents) could be achieved in many ways which are believed to be well known to a person skilled in the art.

Then at step 106, the search engine server 20 ranks the retrieved documents in order of relevance. In order to rank the documents, the search engine server 20 uses a search result ranker. The search result ranker is an algorithm that uses pre-impression features associated with the documents to give a relevance score to each document and then sorts the documents by scores. Pre-impression features are features that can be calculated based on data available before the result page is shown to the user 14. Pre-impression features include, but not limited to, relationship between the text of the document and the query, document metadata, user-specific popularity of a document, and a match between the text of a document and a user's interest profile.

Even though the search engine server 20 has been described as using pre-impression features associated with the documents to rank the document as part of step 106, in alternative embodiments, the documents can be ranked on pre-impression features, as well as post-impression features associated with other users' interactions with SERPs provided in response to the same, substantially the same or similar search queries previously submitted by other users. The indication of the post-impression features can be stored in a log (not depicted), accessible by the search engine server 20. In some embodiments, the indication of the post-impression features can be anonymized (i.e. not be associated with an identity of the past users who were performing the same, substantially the same or similar searches). Details of various embodiments of post-impression features will be provided herein below).

Figure 3:
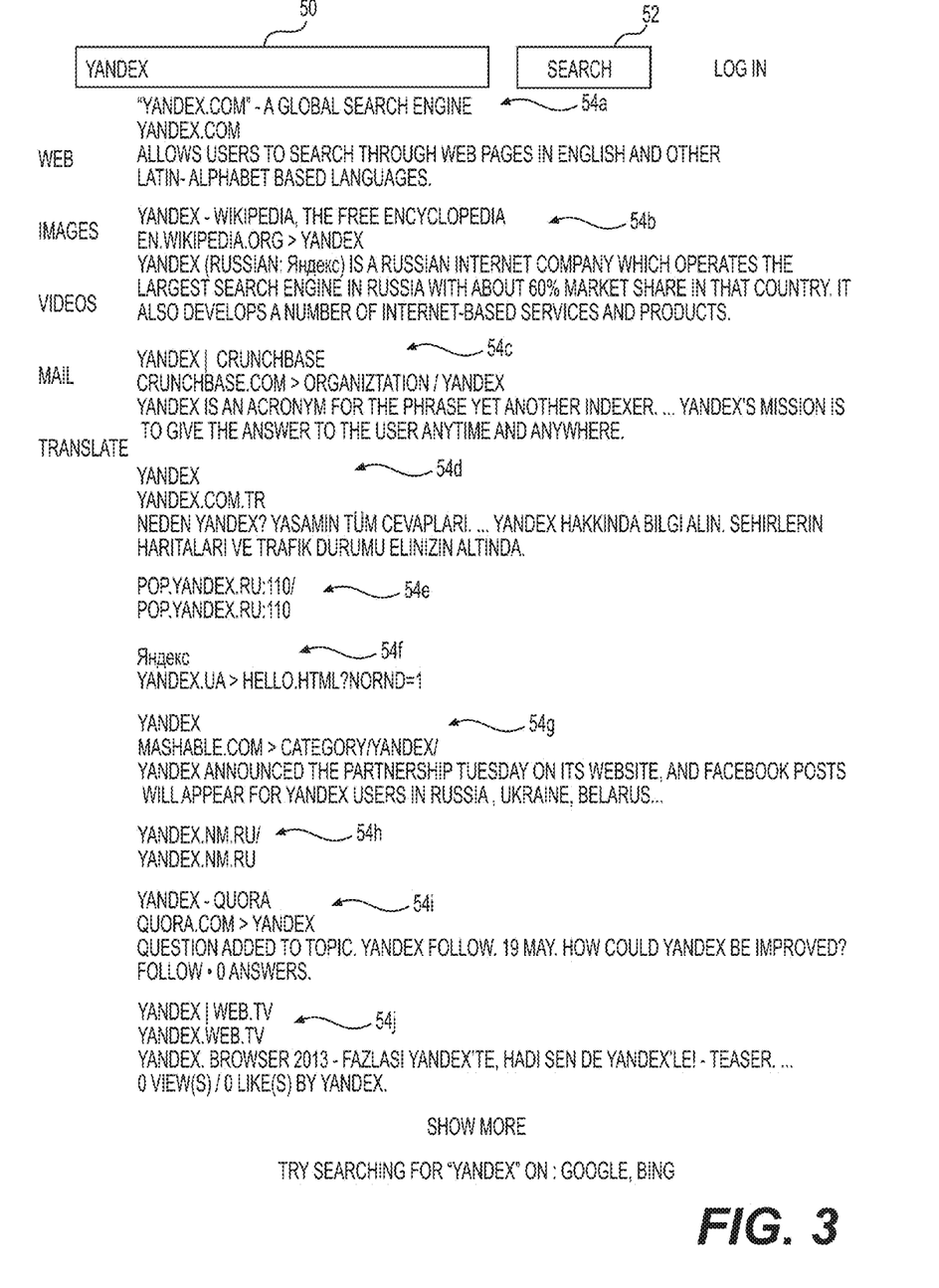
FIG. 3 illustrates an example of a search engine result page (SERP)

Then at step 108, the search engine server 20 sends instructions to the client device 12 via the Internet 16 to display a SERP, such as the one shown in FIG. 3. The client device 12 receives these instructions and displays the SERP to the user 14 on a screen of the client device 12. The SERP includes links and an associated short description or portion of the document 54 (FIG. 3) for the documents resulting from the search query.

The links 54 are ranked in order of most relevant to least relevant starting at the top of the SERP as determined by the search result ranker. In the example provide in FIG. 3, the link 54A which is at the top of the SERP links to the document which the search result ranker ranked as being the most relevant, with the link 54B being the second most relevant and so on.

At step 110, the search engine server 110 captures the interaction of the user 14 with the search results displayed on the SERP and stores it in the Q-D pairs database 24. Each document listed on the SERP forms a Q-D pair for this particular query, and the user's interaction with the documents of the Q-D pairs is recorded as post-impression features for these particular Q-D pairs. Examples of interaction include, but are not limited to, which documents did the user 14 view (or "click"), how long a document was viewed, which document has been viewed first and which has been viewed last. This data is then used by the search engine server 20 to optimize the search result ranker as will be described below.

The method used by the search engine server 20 to provide search results in response to a user query ends at step 112 when the user 14 initiates a new search, in which case the method begins again at step 100 for the new search, when the SERP has not been accessed for more than a certain amount of time, or when the user 14 closes the user interface. It is contemplated that other actions could cause the method to end.

Figure 4:
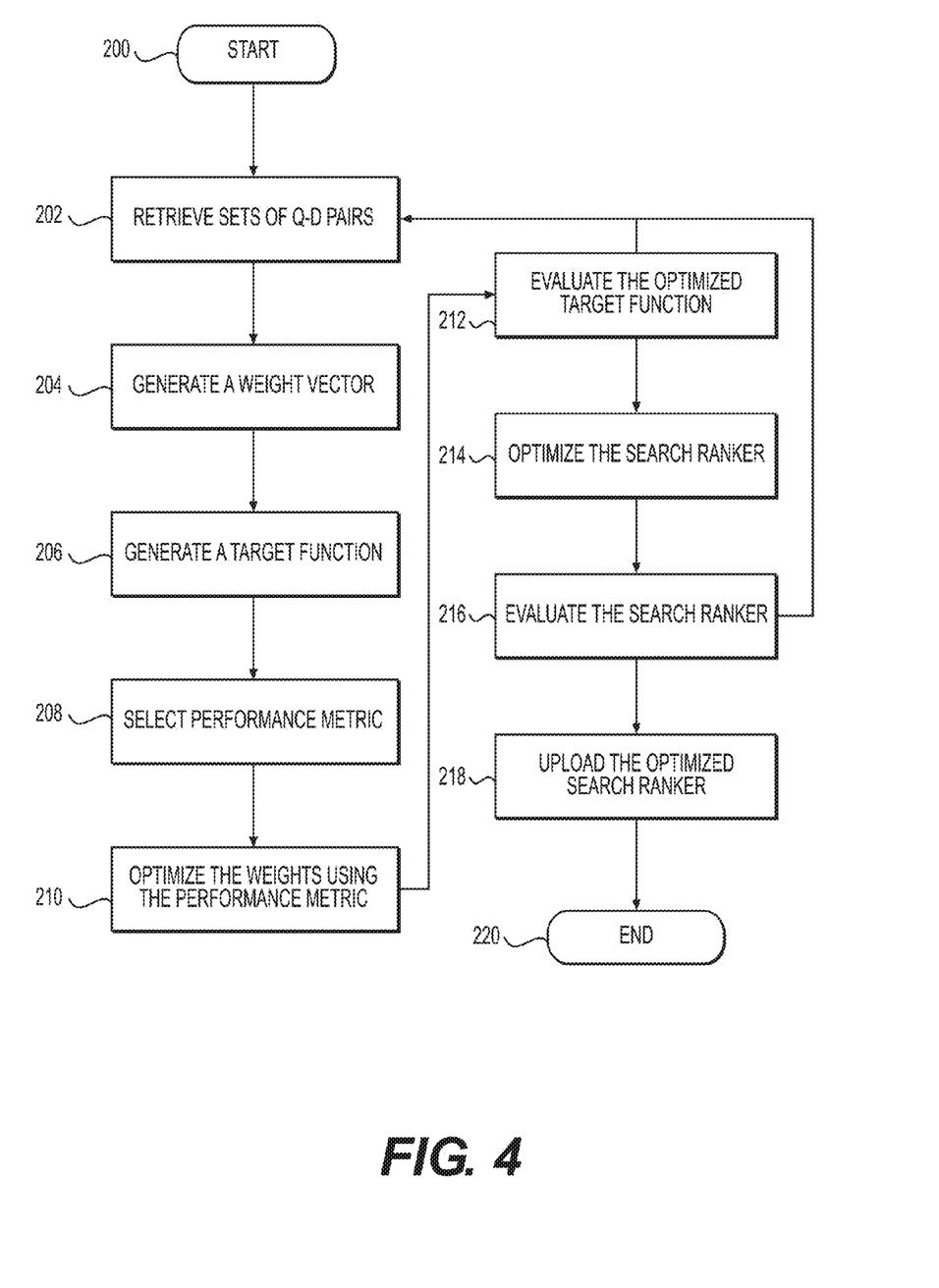
FIG. 4 illustrates an implementation of a computerized method for optimizing search results rankings.

Turning now to FIG. 4, a method for optimizing the search result ranker will be described. By optimizing the search result ranker, the ranking of search results by such an optimized search ranker is also optimized.

The method is initiated at 200 by copying the search result ranker currently being used by the search engine server 20 onto the training server 22. It is contemplated that instead of copying the search result ranker currently being used by the search engine server 20, that the method could be performed on any search result ranker which could then be compared to the search ranker currently being used by the search engine server 20 and if this optimized new search ranker provides improved ranking, this new optimized search ranker could be uploaded to the search engine server to replace the search result ranker currently being used by the search engine server 20 as described in step 218 below. Subsequent steps 202 to 218 can then be performed offline (i.e. without communication to the internet 16 or the search engine server 20) by the training server 22, but with a network connection to the Q-D pairs database 24.

At step 202, the training server 22 retrieves from the Q-D pairs database 24 sets of Q-D pairs, which in the present case is the four sets of Q-D pairs 26, 28, 30, 32. It is contemplated that more of less than four sets of Q-D pairs could be used. Each Q-D set contains a number of Q-D pairs. Each Q-D pair has pre-impression and post-impression features associated with it. Examples of pre-impression features were provided above. The post-impression features correspond to the response of a user 14 to the listing and ranking of a document (D) for the particular query Q of the Q-D pair. There exist two types of post-impression features: document level features and SERP level features.

Examples of document level post-impression features include but are not limited to: a click feature identifying if a document has been clicked; a dwell feature identifying a dwell time on a document; a long dwell feature identifying if the dwell time on the document is greater than a predetermined amount; a last clicked feature identifying if the document has been clicked last; a first clicked feature identifying if the document has been clicked first; a satisfied click feature identifying if the document has been clicked last or if the dwell time is greater than the predetermined amount; a position feature identifying the original position of the document in the SERP; a skip feature identifying if the document has been skipped; a previous skipped feature identifying if another document prior in a ranking to the document has been skipped; and a skipped above feature identifying a number of documents prior in the ranking to the document have been skipped.

All of these features are binary, meaning they have a value of 0 or 1, except for the dwell feature, the position feature and the skip above feature. For the non-binary features (i.e. dwell, position and skip above), the possible values of these are separated into multiple discretization levels each of which is binary.

For example, if in the exemplary SERP shown in FIG. 3 the document 54A is not clicked by the user and the document 54B is the first one clicked on the SERP but the user quickly returned to the SERP because the document did not correspond to what he was looking for and other documents were clicked after, then for the document 54B, click has a value of 1, the first discretization level of the dwell features (i.e. from 0 to a short time) has a value of 1 and all subsequent discretization levels (i.e. ranges of longer time periods) have a value of 0, long dwell has a value of 0, last clicked has a value of 0, first clicked has a value of 1, satisfied click has a value of 0, the first position discretization level corresponding to the top position on the SERP has a value of 0, the second position discretization level corresponding to the second position on the SERP has a value of 1, subsequent position discretization levels have a value of 0, skip has a value of 0, previous skipped has a value of 1, the first skipped above discretization level corresponding to no documents skipped above has a value of 0, the second skipped above discretization level corresponding to one document skipped above has a value of 1, and subsequent skipped above discretization levels have a value of 0.

Examples of SERP level post-impression features include but are not limited to: a top click feature identifying a highest ranking of clicked documents in a ranking; a bottom click feature identifying a lowest ranking of clicked documents in the ranking; a number of clicks feature identifying a number of clicks on a SERP; a top three number of clicks feature identifying a number of clicks on a three highest ranked documents of the SERP; a number of skips feature identifying a number of documents skipped on the SERP; a last query feature identifying a last query in a search session; and an examination time feature identifying a time to a first click on the SERP.

Of these, only the last query feature is a binary feature. All the other SERP level features listed above are non-binary features and the possible values of these are separated into multiple discretization levels each of which is binary.

It is contemplated that each Q-D pair could have more or fewer post-impression features than those listed above. It is also contemplated that each Q-D pair could have post-impression features that are different from those listed above. It is also contemplated that the subsequent steps of the method may use only some of the post-impression features provided for each Q-D pair.

It is also contemplated that each Q-D pair could have post-impression features that are combinations of other post-impression features. One such feature corresponds to the document of the Q-D pair having been skipped and not clicked. Another such feature corresponds to the document previous to the document of the Q-D pair having been skipped and the document of the Q-D pair having been clicked. Other combinations of post-impression features are contemplated.

As such, for each Q-D pair there is a post-impression feature vector. The post-impression feature vector is an M-dimensional row vector of post-impression features, where M corresponds to the number of post-impression features and discretization levels of post-impression features associated with the Q-D pair.

Following step 202, at step 204 the training server 22 generates a weight vector. The weight vector is an M-dimensional column vector of weights. As such, the number of weights in the weight vector corresponds to the number of post-impression features and discretization levels of post-impression features associated with the Q-D pairs of the sets or Q-D pairs 26, 28, 30, 32 (i.e. there are M weights).

Then at step 206, by using the weight vector and the post-impression feature vectors of the Q-D pairs of the set of Q-D pairs 26, for example, the training server 22 generates a target function. In the target function, each post-impression feature has an associated weight. By optimizing, or tuning, the value of these weights as described in the following steps, one can determine the relative relevance of each post-impression feature in determining the relevance of a document. Post-impression features that are more relevant will be given a bigger weight. In its simplest form, the target function is a linear function. However, non-linear target functions are also contemplated.

At step 208, a performance metric (performance measure) is selected which will be used to optimize the target function at step 210. The performance metric is a statistical measure used to evaluate the target function. There exist many different types of performance metric. Examples include, but are not limited to, mean reciprocal rank (MRR), mean average precision (MAP), discounted cumulative gain (DCG), and normalized cumulative gain (NDCG). Depending on the post-impression features which the target function takes into account, some performance metrics may be more suitable than others.

Then at step 210, the training server 22 uses the metric selected at step 208 and the target function generated at step 206 with the set of Q-D pairs 26 to optimize the weights of the target function, which results in an optimized target function. The weights are optimized via an iterative process.

In the present implementation, the optimization of the weights is achieved using a gradient descent technique. It is contemplated that other gradient-based optimization techniques could be used. Once a certain number of iterations have been completed or a variation in the value of the weights is smaller than a predetermined value, the training server proceeds to step 212.

It is contemplated other weight parameters could be included in the optimization of the target function. These other weights are used in the estimation of an error function and represent a level of confidence in the values of the target function. The optimization procedure would then adjust these other weights in order to reduce the error level, thus further improving the resulting optimized target function.

At step 212, the training server 22 evaluates the optimized target function resulting from step 210 by applying it to the set of Q-D pairs 28. The evaluation is performed using the performance metric selected at step 208 applied to the optimized target function resulting step 210.

If the optimized target function resulting from step 210 performs adequately on the set of Q-D pairs 28, for example by providing better results than the target function of step 206 applied on the set of Q-D pairs 28, then the training server 22 proceeds to step 214. If it does not perform adequately, then the method returns to step 202 and the method proceeds using a different set of Q-D pairs to generate a new target function.

Alternatively, if the optimized target function does not perform adequately, then the method could return to step 208 to select a different performance metric and then performing step 210 with this new metric, or could return to step 210 to use a different optimization technique. It is contemplated that, alternatively, at step 212 the training server 22 could evaluate the target function resulting from each iteration of the target function at step 210 and select the one that provides the best performance.

After having identified an optimized target function at step 212, at step 214 the training server 22 optimizes the search result ranker using the optimized target function with the set of Q-D pairs 30. The training server 22 ranks documents of the Q-D pairs of the set 30 using the search result ranker which evaluates the relevance of the documents in terms of their pre-impression features associated with the Q-D pairs and compares this ranking to the ranking obtained by the optimized target function which ranks the documents of the Q-D pairs in terms of their post-impression features associated with the Q-D pairs.

The training server 22 then uses machine learning techniques to optimize the search result ranker in order to more closely match the ranking obtained by the optimized target function. For example, the search result ranker could be optimized using a performance metric and an optimization process similar to the one described above at step 210 for the optimization of the target function. It is contemplated that instead of using all of the parameters of the optimized target function, only those having the biggest weights or only the one having the biggest weight could be used for ranking the documents of the Q-D pairs based on the post-impression features.

At step 216, the training server 22 evaluates the optimized search result ranker from step 214 by applying it to the set of Q-D pairs 32. The evaluation is performed in a manner similar to the manner used to evaluate the optimized target function at step 212 or by any other known technique. If the optimized search result ranker resulting from step 216 performs adequately on the set of Q-D pairs 32, for example by providing better results than the search result ranker retrieved at step 200 applied on the set of Q-D pairs 32, then the training server 22 proceeds to step 218.

If it does not perform adequately, then the method returns to step 202 and the method proceeds using a different set of Q-D pairs to generate a new target function resulting in a new optimized search result ranker. Alternatively, if the search result ranker does not perform adequately, then the method could return to step 208 to select a different performance metric and then performing step 210 with this new metric, or could return to step 210 to use a different optimization technique for the target function or could return to step 216 to use a different optimization technique for the search result ranker. It is contemplated that, alternatively, at step 216 the training server 22 could evaluate the search result ranker resulting from each iteration of the search result ranker at step 214 and select the one that provides the best performance.

After having validated the optimized search result ranker at step 216, at step 218 the training server 22 uploads the optimized search result ranker to the search engine server 20. The optimized search result ranker replaces the search result ranker that was previously stored on the training server 22. The optimized search result ranker is then used by the search engine server 20 to rank documents at 106 of the method described above.

The method then ends at step 220. The method of steps 200 to 220 is repeated on a regular basis as the number of Q-D pairs increases constantly and the needs of users evolve over time.

Instructions for performing the method of steps 100 to 112 described above are stored on one or more tangible computer readable storage mediums communicating with one or more processors of the search engine server 20. The one or more processors execute these instructions to perform the method.

Similarly, instructions for performing the method of steps 200 to 220 described above are stored on one or more tangible computer readable storage mediums communicating with one or more processors of the training server 22. The one or more processors execute these instructions to perform the method. It is contemplated that one or more common tangible computer readable storage mediums could be used to store the instructions for performing the method of steps 100 to 112 and the method of steps 200 to 220.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A computerized method for optimizing search result rankings obtained from a search result ranker, the search result ranker executing a search result ranking algorithm, the method comprising:
    retrieving a first set of query-document pairs, each query-document pair of the first set having an associated post-impression features vector representative of a number of post-impression features associated with a document of the query-document pair;
    generating an original weight vector having a number of originally-assigned weights corresponding to the number of post-impression features in each of the post-impression features vector of the first set;
    generating a target function by using the weight vector and the post-impression features vectors of the first set, the original weight vector having the number of originally-assigned weights of the first set;
    using a performance metric associated with the search ranking algorithm, optimizing the originally-assigned weights of the weight vector using the first set of query-document pairs to obtain an optimized target function, the optimized target function including a number of optimized weights, the optimized weights of the optimized target function representative of an impact of each post-impression feature of the post-impression features vector to a determination of a relevance of the document, the optimizing being executed such that the performance metric of the search ranking algorithm is maximized;
    using the optimized target function, generating a relevance label for each query-document pair of the first set;
    optimizing the search result ranking algorithm using a relevance label of each query-document pair of the first set generated by the optimized target function; and
    using the optimized search result ranking algorithm to rank search results.

2. The method of claim 1, further comprising selecting the performance metric based on features of the target function.

3. The method of claim 1, wherein optimizing the search result ranking algorithm using the relevance label of each query-document pair of the first set generated by the optimized target function includes optimizing the search result ranking algorithm using the relevance label of each query-document pair of a second set of query-document pairs generated by the optimized target function.

4. The method of claim 3, wherein, after optimizing the search result ranking algorithm and before using the search result ranking algorithm, the method further comprises:
    evaluating the optimized search result ranking algorithm using a third set of query-document pairs.

5. The method of claim 1, wherein the post-impression features include at least one of at least one document level feature and at least one search engine result page (SERP) level feature.

6. The method of claim 5, wherein the at least one document level feature includes at least one of:
    a click feature identifying if a document has been clicked;
    a dwell feature identifying a dwell time on a document;
    a long dwell feature identifying if the dwell time on the document is greater than a predetermined amount;
    a last clicked feature identifying if the document has been clicked last;
    a first clicked feature identifying if the document has been clicked first;
    a satisfied click feature identifying if the document has been clicked last or if the dwell time is greater than the predetermined amount;
    a position feature identifying the original position of the document in the SERP;
    a skip feature identifying if the document has been skipped;
    a previous skipped feature identifying if another document prior in a ranking to the document has been skipped; and
    a skipped above feature identifying a number of documents prior in the ranking to the document have been skipped.

7. The method of claim 5, wherein the at least one SERP level feature includes at least one of:
    a top click feature identifying a highest ranking of clicked documents in a ranking;
    a bottom click feature identifying a lowest ranking of clicked documents in the ranking;
    a number of clicks feature identifying a number of clicks on a SERP;
    a top three number of clicks feature identifying a number of clicks on a three highest ranked documents of the SERP;
    a number of skips feature identifying a number of documents skipped on the SERP;
    a last query feature identifying a last query in a search session; and
    an examination time feature identifying a time to a first click on the SERP.

8. The method of claim 1, wherein the post-impression features include at least one of:
    a click feature identifying if a document has been clicked;
    a dwell feature identifying a dwell time on a document;
    a long dwell feature identifying if the dwell time on the document is greater than a predetermined amount;
    a last clicked feature identifying if the document has been clicked last;

a first clicked feature identifying if the document has been clicked first;

a satisfied click feature identifying if the document has been clicked last or if the dwell time is greater than the predetermined amount;

a position feature identifying the original position of the document in the SERP;

a skip feature identifying if the document has been skipped;

a previous skipped feature identifying if another document prior in a ranking to the document has been skipped;

a skipped above feature identifying a number of documents prior in the ranking to the document have been skipped;

a top click feature identifying a highest ranking of clicked documents in the ranking;

a bottom click feature identifying a lowest ranking of clicked documents in the ranking;

a number of clicks feature identifying a number of clicks on a SERP;

a top three number of clicks feature identifying a number of clicks on a three highest ranked documents of the SERP;

a number of skips feature identifying a number of documents skipped on the SERP;

a last query feature identifying a last query in a search session; and an examination time feature identifying a time to a first click on the SERP.

9. The method of claim 1, wherein using the search result ranking algorithm comprises:

receiving, by at least one server from a client device via a communications network, a search query;

effecting, by the at least one server, a search in respect of the search query;

ranking, by the at least one server, documents found by the search using the search result ranking algorithm incorporating the optimized target function;

sending, by the at least one server to the client device via the communications network, instructions to cause a display to a user via a user interface of the client device of a search engine results page (SERP) including links to the documents found by the search, the links being ranked on the SERP according to the ranking of the documents found by the search.

10. The method of claim 1, wherein optimizing the originally-assigned weights of the weight vector includes optimizing the originally-assigned weights of the weight vector using a gradient descent technique.

11. The method of claim 1, wherein the performance metric is one of mean reciprocal rank (MRR) and mean average precision (MAP).

12. A system for optimizing search result rankings obtained from a search result ranker, the search result ranker executing a search result ranking algorithm, the system comprising:

a processor; and a tangible non-transitory computer readable storage medium communicating with the processor and storing instructions that cause the system to perform the steps of:

retrieving a first set of query-document pairs, each query-document pair of the first set having an associated post-impression features vector representative of a number of post-impression features associated with a document of the query-document pair;

generating an original weight vector having a number of originally-assigned weights corresponding to the number of post-impression features in each of the post-impression features vector of the first set;

generating a target function by using the weight vector and the post-impression features vectors of the first set, the original weight vector having the number of originally-assigned weights of the first set;

using a performance metric associated with the search ranking algorithm, optimizing the originally-assigned weights of the weight vector using the first set of query-document pairs to obtain an optimized target function, the optimized target function including a number of optimized weights, the optimized weights of the optimized target function representative of an impact of each post-impression feature of the post-impression features vector to a determination of a relevance of the document, the optimizing being executed such that the performance metric of the search ranking algorithm is maximized;

using the optimized target function, generating a relevance label for each query-document pair of the first set;

optimizing the search result ranking algorithm using a relevance label of each query-document pair of the first set generated by the optimized target function; and using the optimized search result ranking algorithm to rank search results.

13. The system of claim 12, wherein the tangible non-transitory computer readable storage medium also stores instructions that cause the system to perform the step of selecting the performance metric based on features of the target function.

14. The system of claim 12, wherein optimizing the search result ranking algorithm using the relevance label of each query-document pair of the first set generated by the optimized target function includes optimizing the search result ranking algorithm using the relevance label of each query-document pair of a second set of query-document pairs generated by the optimized target function.

15. A tangible non-transitory computer readable storage medium storing instructions for optimizing search result rankings obtained from a search result ranker, the search result ranker executing a search result ranking algorithm, the instructions, when executed by a computer, cause the computer to perform operations comprising:

retrieving a first set of query-document pairs, each query-document pair of the first set having an associated post-impression features vector representative of a number of post-impression features associated with a document of the query-document pair;

generating an original weight vector having a number of originally-assigned weights corresponding to the number of post-impression features in each of the post-impression features vector of the first set;

generating a target function by using the weight vector and the post-impression features vectors of the first set, the original weight vector having the number of originally-assigned weights of the first set;

using a performance metric associated with the search ranking algorithm, optimizing the originally-assigned weights of the weight vector using the first set of query-document pairs to obtain an optimized target function, the optimized target function including a number of optimized weights, the optimized weights of the optimized target function representative of an impact of each post-impression feature of the post-impression features vector to a determination of a relevance of the document, the optimizing being executed such that the performance metric of the search ranking algorithm is maximized;

optimizing the search result ranking algorithm using a relevance label of each query-document pair of the first set generated by the optimized target function; and using the optimized search result ranking algorithm to rank search results.

16. The non-transitory storage medium of claim 15, wherein the operations further comprise selecting the performance metric based on features of the target function.

17. The non-transitory storage medium of claim 15, wherein optimizing the search result ranking algorithm using the relevance label of each query-document pair of the first set generated by the optimized target function includes optimizing the search result ranking algorithm using the relevance label of each query-document pair of a second set of query-document pairs generated by the optimized target function.

\* \* \* \* \*